United States Patent

[11] 3,601,230

| [72] | Inventor | Edward F. Platz |
| | | Detroit, Mich. |
| [21] | Appl. No. | 51,483 |
| [22] | Filed | July 1, 1970 |
| [45] | Patented | Aug. 24, 1971 |
| [73] | Assignee | Ford Motor Company |
| | | Dearborn, Mich. |

[54] PARKING BRAKE FOR A VEHICLE DRIVELINE
4 Claims, 9 Drawing Figs.

[52] U.S. Cl. .................................................. 188/31,
192/4 A, 192/109 A, 188/69, 74/527
[51] Int. Cl. .................................................. B60t 1/00
[50] Field of Search ........................................... 192/4 A,
109 A; 188/31, 60, 69

[56] References Cited
UNITED STATES PATENTS

| 2,814,361 | 11/1957 | Schmidt | 192/4 A X |
| 2,860,731 | 11/1958 | Hause | 188/69 |
| 2,875,856 | 3/1959 | Mrlik et al. | 192/4 A X |
| 3,386,532 | 6/1968 | Moss | 192/4 A X |

Primary Examiner—Benjamin W. Wyche
Attorneys—John R. Faulkner and Donald J. Harrington ABSTRACT: A parking brake for an automatic power transmission in an automotive vehicle driveline comprising a personally operable brake lever adapted for oscillation in the transmission housing about an axis that is disposed transversely with respect to the axis rotation of the torque output shaft, a brake pawl pivoted on the transmission housing, a cam rod adapted to be moved into engagement with the pawl to effect application of the brake, a linkage connection between the brake lever and the cam rod and an overload spring means for maintaining the brake lever and the cam rod in assembled relationship.

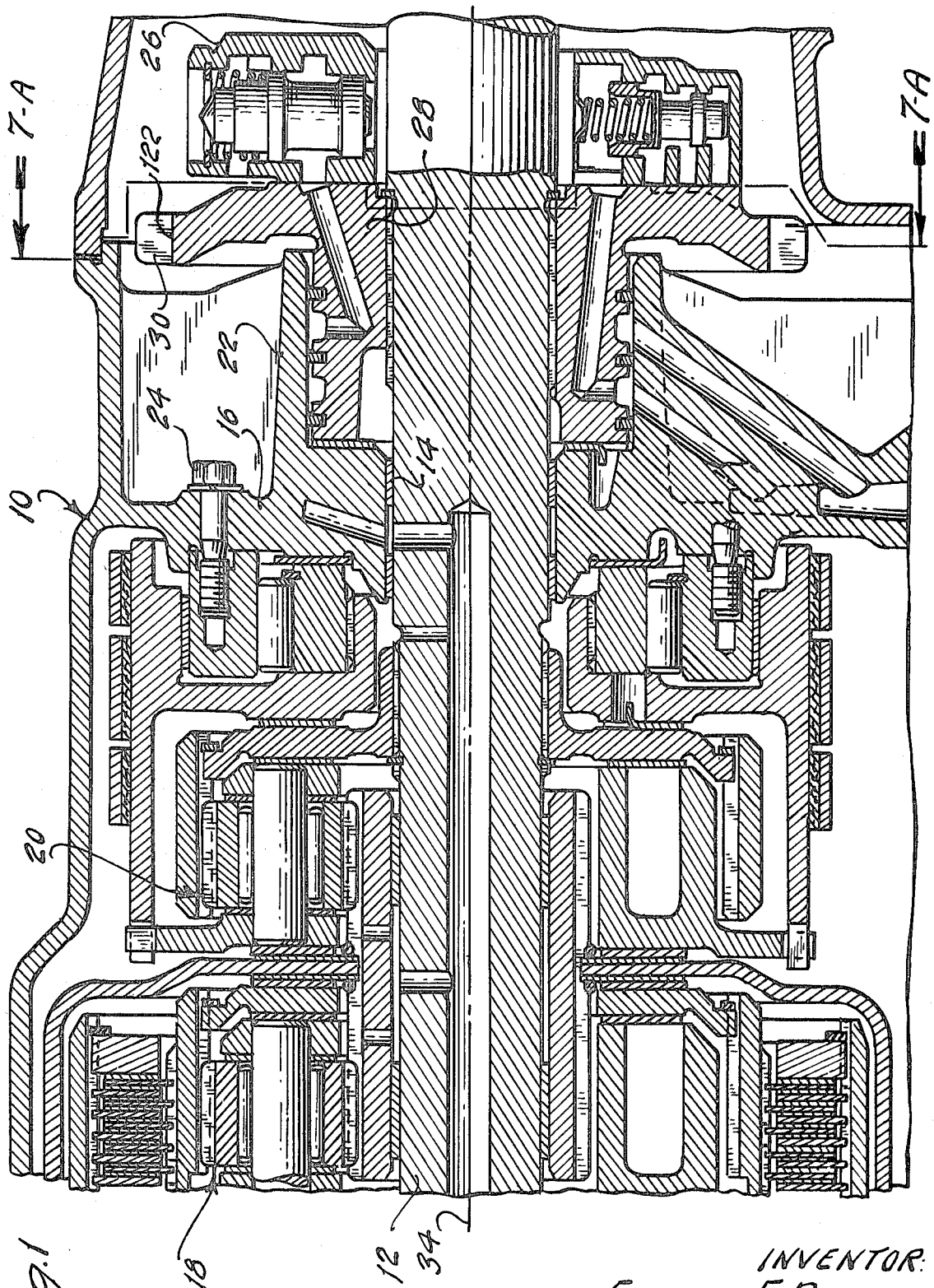

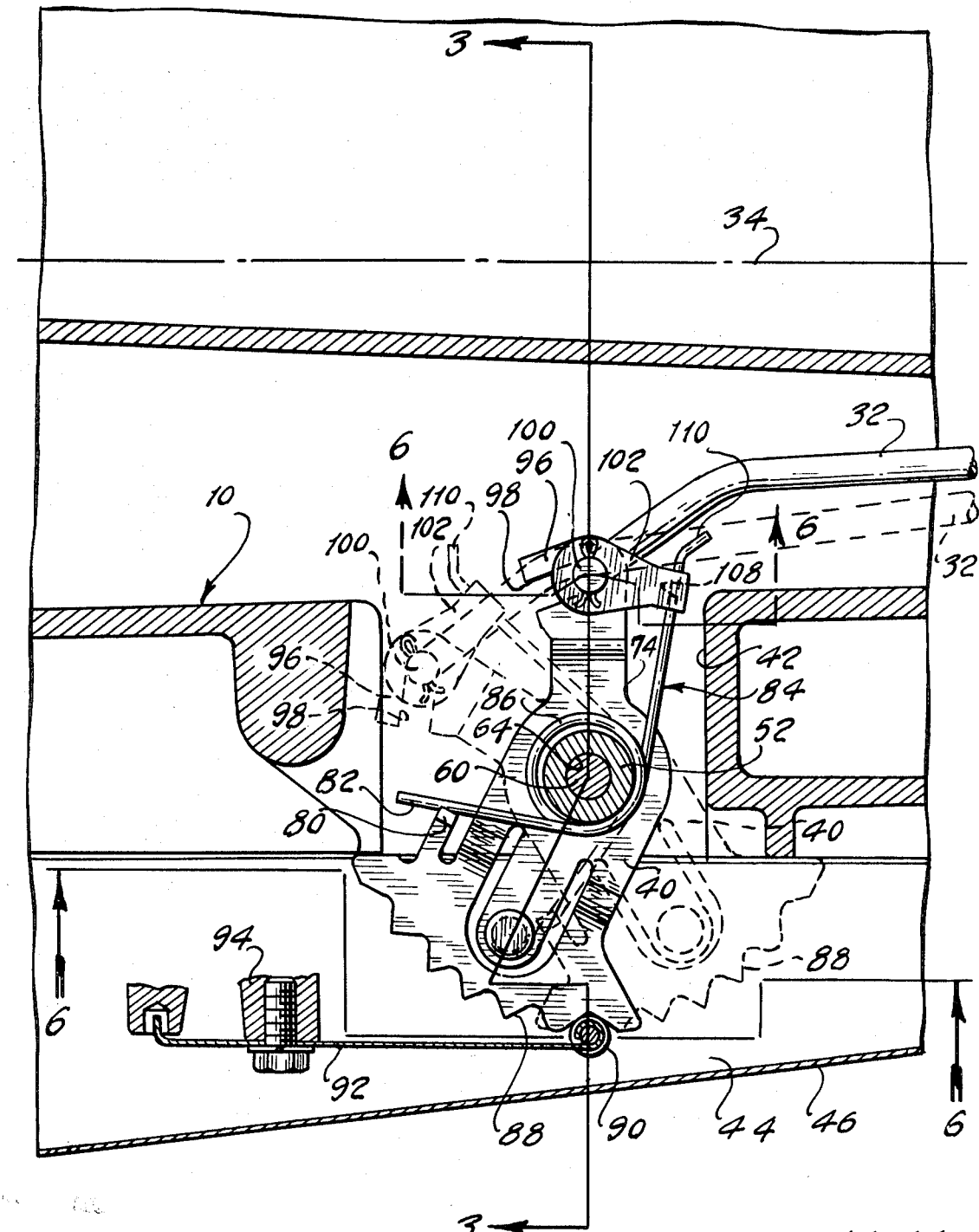

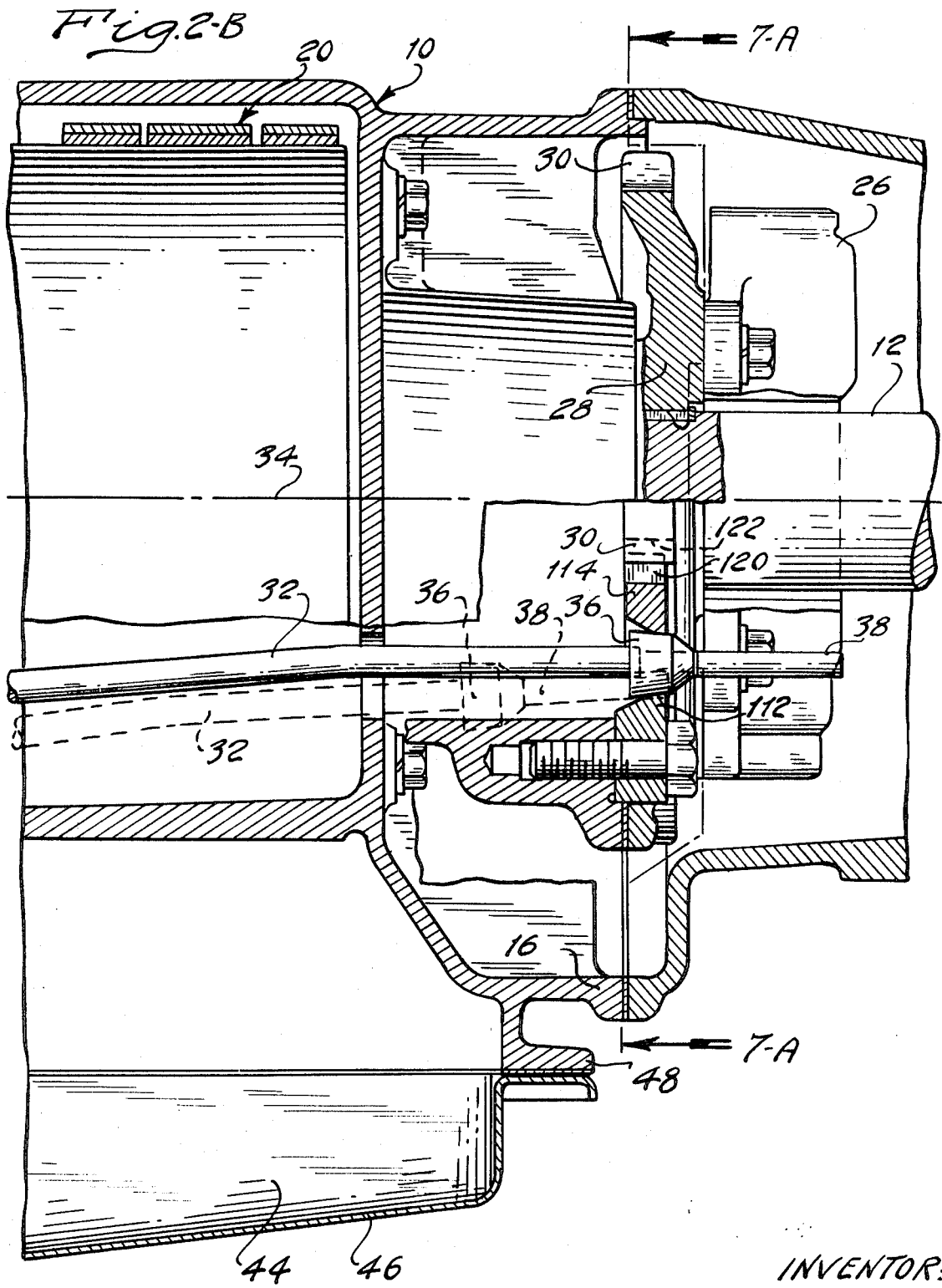

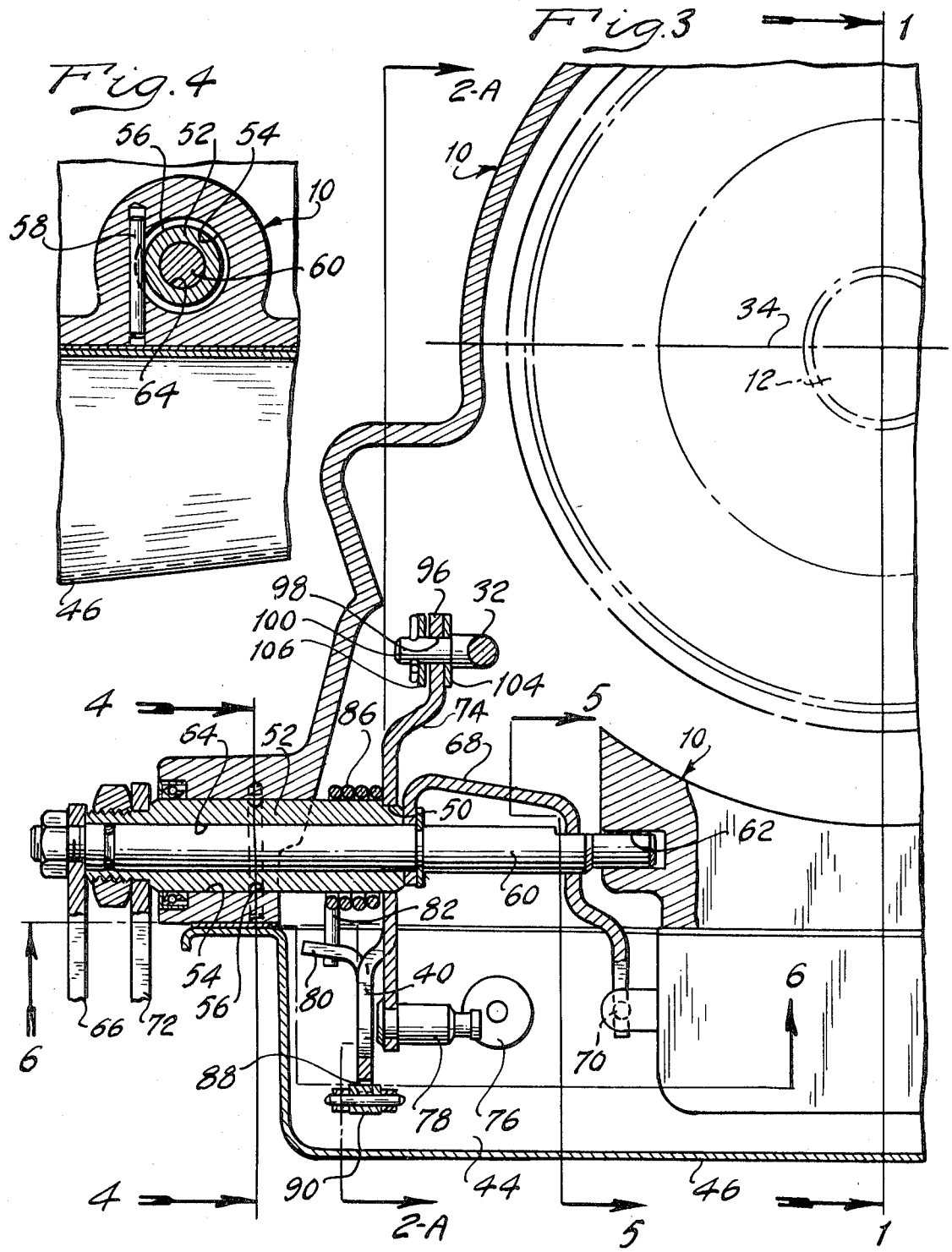

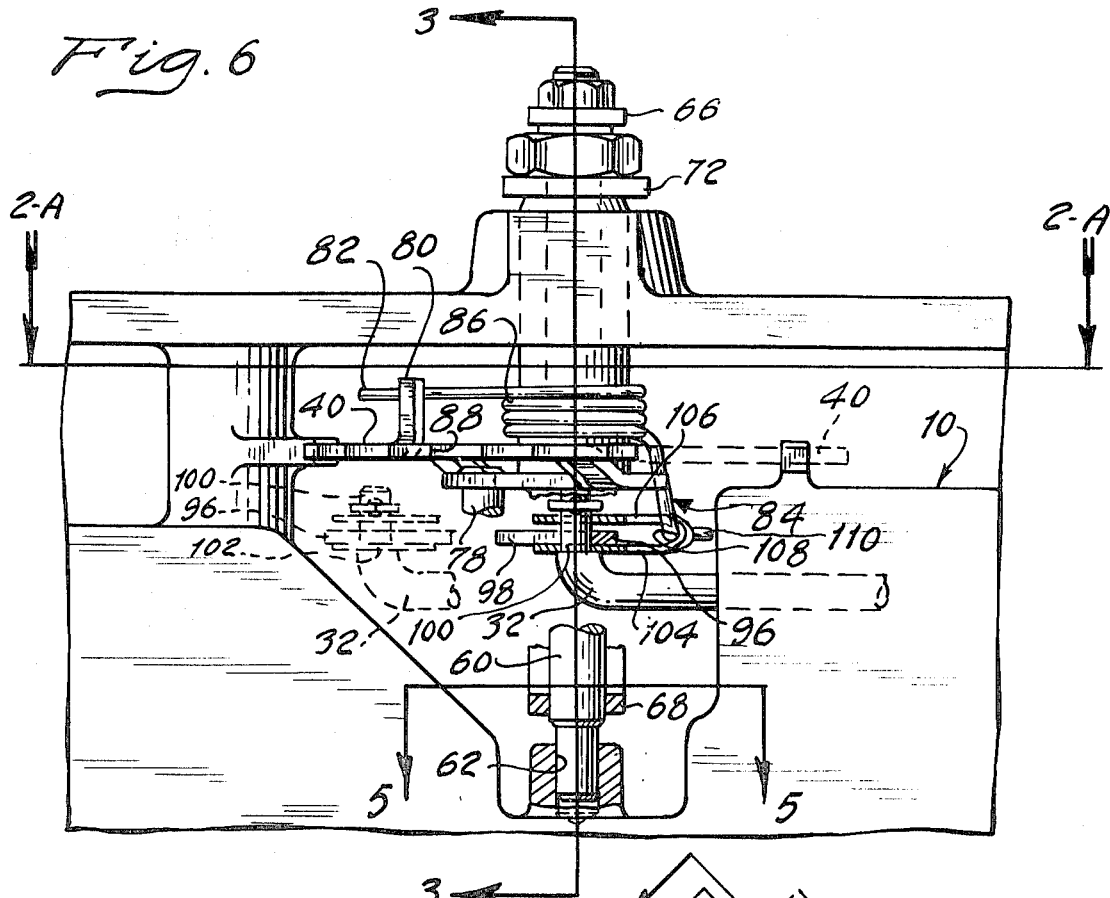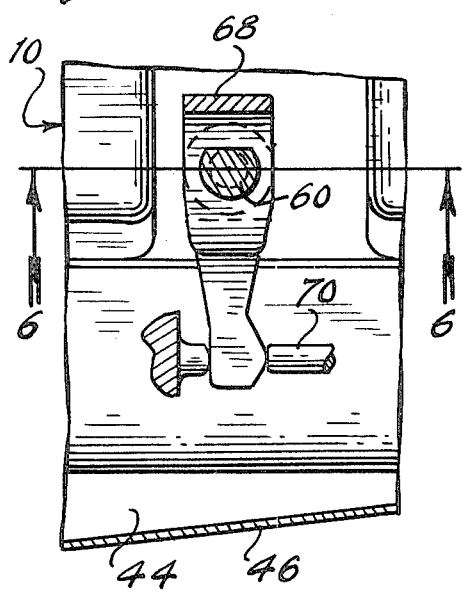

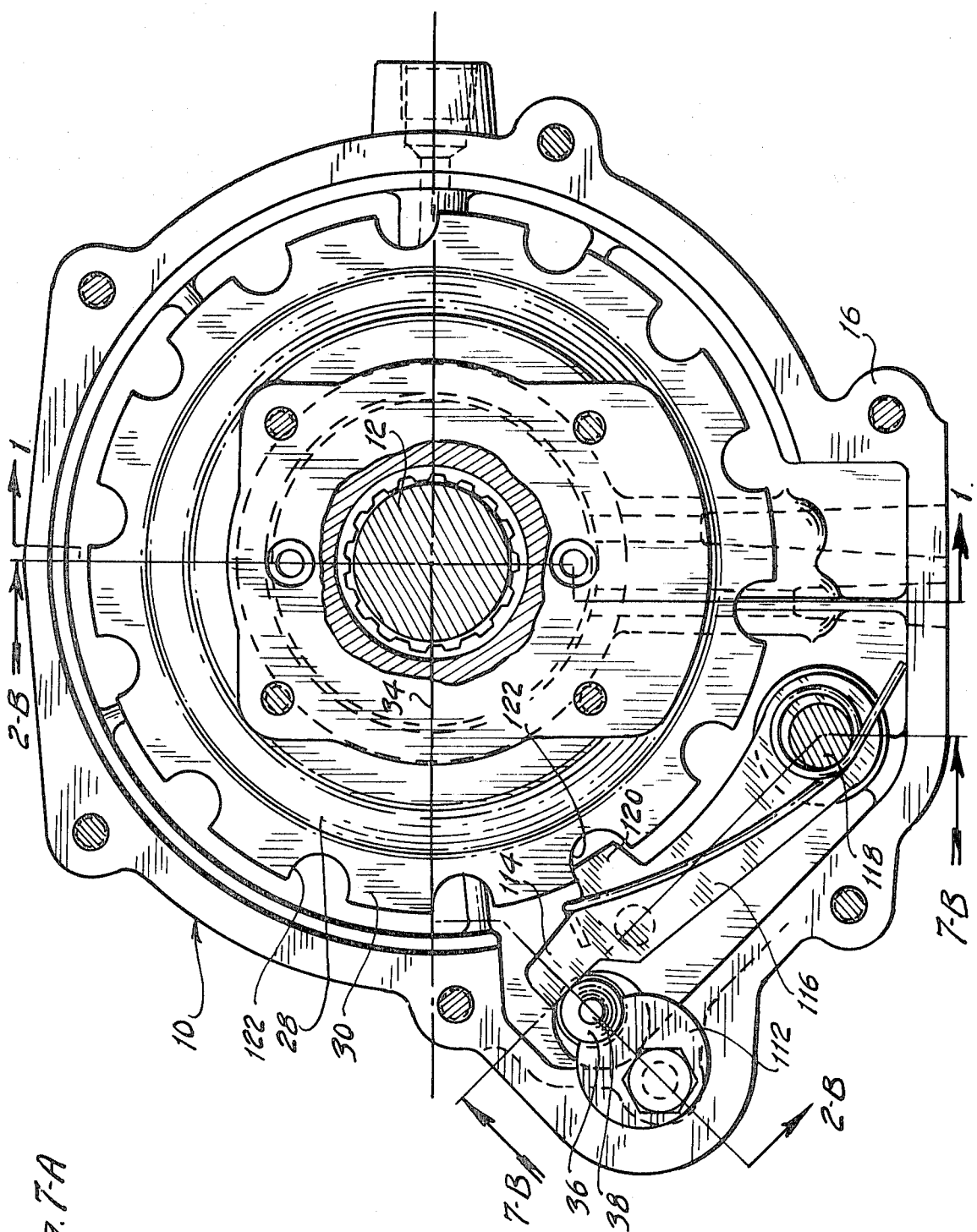

PARKING BRAKE FOR A VEHICLE DRIVELINE

GENERAL DESCRIPTION OF THE INVENTION

Automatic power transmission mechanisms for automotive vehicles usually include a hydrokinetic torque converter for transferring engine torque from the engine crankshaft of an internal combustion engine to the torque input portions of the transmission clutches and brakes. An engine driven pump supplies fluid pressure to the clutches and brakes to establish any one of several transmission speed ratios. When the engine is not operating, the clutches and brakes become inactive and the transmission torque delivery path is interrupted. It is usual practice under those conditions to provide a mechanical parking brake for connecting directly the transmission output shaft to the stationary housing of the transmission to avoid a rolling motion of the vehicle when the vehicle is parked. One such mechanism is shown in my U.S. Pat. No. 3,213,968. Another is shown in U.S. Pat. No. 3,187,846. Both of these patents are assigned to the assignee of my instant invention.

Like the earlier designs illustrated in prior art patents, the parking brake mechanism of my invention includes a cam rod, which is adapted to be moved in a generally axial direction. The rod carries a cam element that is engageable with the heel of the parking pawl. It is engageable also with a reaction shoulder formed on the transmission housing so that axial movement of the rod will produce rotary movement of the parking pawl into braking engagement with a parking gear carried by the transmission torque output shaft. My improved construction differs from such prior art arrangements, however, by including in combination with the brake actuator rod a spring biased leverage mechanism for translating manual adjustment of an actuator lever into reciprocating motion of the cam. It permits assembly of the brake mechanism through the opening provided normally in the lower portion of the transmission housing which is covered by an oil pan. The oil pan serves as an oil sump for the automatic transmission control oil. The parking brake mechanism may be inserted through the lower opening in the transmission housing before the oil pan is assembled.

My improved parking brake mechanism will accommodate a limited amount of lost motion in the connection between the driver operated lever and the cam rod. Thus, when the pawl of the parking brake becomes misaligned with the parking gear tooth opening, the movement of the lever by the operator may continue as the preloaded spring means accommodates limited lost motion in the assembly. After the parking pawl becomes aligned with the parking brake gear tooth space, the pawl will move into place under the influence of the preloaded spring means.

During assembly of the mechanism the cam rod is brought into registry with the driver operated lever. A pivoting latch carried by the end of the cam rod is rotated until it is positioned over the end of the spring element of the preloaded spring means thereby locking the assembly together.

My improved construction makes it unnecessary to provide a ratcheting mechanism at the operating end of the cam rod as is the case in my earlier design shown in U.S. Pat. No. 3,213,968. It simplifies, furthermore, the overall design and reduces the space within the transmission housing necessary to accommodate the brake elements.

BRIEF DESCRIPTION OF THE FIGURES OF THE DRAWING

FIG. 1 shows a partial cross-sectional view of the rearward portion of an automatic power transmission mechanism adapted to accommodate the improvements of my invention. It is taken along section line 1—1 of FIGS. 3 and 7A.

FIG. 2A is an assembly view partly in section, showing parking brake actuating elements. It is taken along the plane of section line 2A—2A of FIGS. 3 and 6.

FIG. 2B is a sectional view taken along section line 2B—2B of FIG. 7A.

FIG. 3 is a cross-sectional view taken along the plane of section line 3—3 of FIG. 2A.

FIG. 4 is a cross-sectional view taken along the plane of section line 4—4 of FIG. 3.

FIG. 5 is a view as seen from the plane of section line 5—5 of FIGS. 3 and 6.

FIG. 6 is a view of the structure of FIG. 2 as seen from the plane of section line 6—6 of FIGS. 2A and 5.

FIG. 7A is a cross-sectional view taken along the plane of section line 7A—7A of FIGS. 1, 2B and 7B.

FIG. 7B is a sectional view taken along section line 7B—7B of FIG. 7A.

PARTICULAR DESCRIPTION OF THE INVENTION

In FIG. 1; numeral 10 designates the housing of a power transmission mechanism. A power output shaft 12 is journaled at 14 within a wall 16, which is formed as part of the transmission housing 10. Planetary gearing units shown at 18 and 20 establish torque delivery paths between the turbine of a hydrokinetic torque converter, not shown, and the shaft 14. The torque converter includes an impeller that is connected to an internal combustion engine, not shown.

For a particular description of the mode of operation of a transmission such as that shown in FIG. 1, reference may be had to U.S. Pat. No. 3,295,387, which is assigned to the assignee of my instant invention.

Power output shaft 12 is received through sleeve member 22, which is bolted by means of bolts 24 to the transmission wall 16. A fluid pressure governor 26 is secured to the shaft 12 and rotates therewith within sleeve 22.

Situated between the sleeve member 22 ad the housing wall 16 is a parking gear 28. This may be splined or keyed to the shaft 12. It is formed with gear teeth 30 on its periphery which are adapted to engage a pawl that will be described with reference to FIG. 7. When the pawl engages the teeth 30, shaft 12 becomes locked to the transmission housing 10 thereby braking the vehicle by preventing rotation of the wheels connected drivably to the shaft 12 through the drive shaft and the differential and axle assembly.

In FIGS. 2A and 2B, reference character 32 represents a parking brake cam rod which extends in a generally longitudinal direction parallel to the axis 34 of the transmission mechanism. A cam element 36 is carried by the rod 32. It is generally conical and it surrounds the rod 32. The end 38 of the rod extends beyond the location of cam element 36.

A brake operating lever 40 is positioned within opening 42 in the housing 12. Opening 42 extends downwardly into the transmission sump 44, which is defined by oil pan 46. This pan is secured by bolts to the lower marginal flange 48 on the transmission housing. A central opening 50 is formed in the lever 40, and rocker shaft 52 extends therethrough as indicated best in FIG. 3. Lever 40 is welded or otherwise secured fast to the shaft 52.

Shaft 52 extends transversely through side opening 54 formed in the housing 10. It is formed with a locking pin groove 56 which receives pin 58 as indicated in FIG. 4. This holds the shaft 52 axially fast in the housing 10.

The opening 42 in the housing 10 is spanned by shaft 60, the inner end of which is received within opening 62 in the housing 10.

Shaft 52 has a central opening 64 through which shaft 60 extends. The outward end of the shaft 60 is connected directly to downshift lever 66, which is adapted to be actuated by the vehicle operator. A downshift valve actuator arm 68 is connected to the inner end of the shaft 60, the latter extending through spaced openings provided in the arm 68. The radially extending part of the arm 68 engages an extension 70 of the downshift valve, which forms a part of the automatic control valve system.

The outwardly extending end of the shaft 52 is connected to lever 72, which is adapted to be manually actuated by the vehicle operator as he selects the various transmission drive ranges.

The inner end of the shaft 52 is connected directly to lever 74, which oscillates with the shaft 52 as the operator moves the lever 72. Manual valve 76, which forms a part of the automatic control valve system, is mechanically connected to pin 78 carried by the lever 74.

A spring anchor tab 80 carried by the lever 74 is adapted to be engaged by one end 82 of preloaded spring 84. The spring 84 includes several coils 86 which encircle shaft 52.

The lower portion of the lever 74 defines detent teeth 88 arranged arcuately about the axis of the shaft 52. The spaces between the teeth are adapted to be engaged by detent roller 90 carried by one end of cantilever spring 92. Spring 92 is secured to boss 94, which forms a part of the housing 10.

As the lever 74 is rotated about the axis of shaft 52, detent roller 90 engages successively the various spaces between the detent teeth 88 each space corresponding to one operating position of the manual valve. The last space between the teeth 88, which is the one shown in full lines in FIG. 2 in engagement with roller 90, corresponds to the park position assumed by the lever 40 when the transmission parking brake is actuated.

Lever 74 includes an arm 96, which has formed therein a slot 98. Cam rod 32 is provided with a right angle portion 100, which is received within the slot 98. A bracket 102 having sidewalls 104 and 106, which straddle the arm 96, is formed with openings through which the right angle portion thereof extends. The walls 104 and 106 are joined together to form a spring pocket 108.

After the end of the rod is received within the slot 98, the bracket 102 may be pivoted about the axis of the rod portion 100 so that it will overlie the end 110 of the spring 84. The other end 82 then is caused to engage the spring anchor portion 80 as that the spring will be loaded, thus maintaining the rod 32 and lever 74 in assembled relationship. The right-hand end of the wall 16 has secured thereto an anchor block 112. This is engaged by cam element 36 as the rod 32 is adjusted in a right-hand direction. Cam element 36 engages also the heel 114 of a brake pawl 116, which is pivoted about shaft 118. This in turn is supported by the transmission housing 10 as indicated in FIGS. 7A and 7B. Pawl 116 includes also a pawl tooth 120 which is adapted to register with parking brake gear tooth spaces 122 formed in parking gear 28.

If the vehicle operator moves lever 74 toward a brake engaging position and the tooth 120 is not in registry with respect to one of the spaces 122, the spring 84 will be caused to yield thereby allowing the end portion 100 of the rod 32 to move within the slot 98. Continued motion of the lever 74 to the full line position indicated in FIG. 2 then will be permitted, although motion of the rod 32 is interrupted. After the parking gear is moved so that the pawl tooth 120 will register with a gear tooth space, the spring 84 will cause the pawl 116 to snap into place thereby locking the power output shaft 12 to the relatively stationary transmission housing.

The assembly problems that normally would be associated with the simplified parking brake linkage mechanism of my invention are avoided by the provision of the lost motion connection between the arm 96 and the rod 32 and by the movable bracket 102. The lever 74 may be assembled through the opening of 42 while the rod 32 is assembled by inserting it through its associated opening in wall 16. The spring 84, which is loosely assembled on the shaft 52 during assembly, then may be locked in place by rotating the bracket 102 over the end 110 of the spring 84. This is followed by adjustment of the end 82 over the spring anchor element 80 thus securing the assembly so that the arms 74 will more in unison with the rod 32. The use of a complex ratchet arrangement on the rearward portion of the transmission structure is avoided because the function normally performed by such ratchet mechanisms is performed instead in my improved design by the simplified spring and bracket assembly that forms a part of the yieldable lost motion connection between the arm 74 and the rod 32.

Having thus described a preferred form of my invention, what I claim and desire to secure by U.S. Letters Patent is:

1. A parking brake structure for a power transmission mechanism having a driven shaft, a parking gear with peripheral teeth carried by said driven shaft for rotation about the axis of said driven shaft, a parking pawl pivoted for oscillation on a stationary portion of said mechanism about an axis parallel to the axis of said parking gear, a cam rod extending generally parallel to the direction of the axis of said driven shaft, a cam element carried by said cam rod and adapted to engage said pawl as said rod is shifted transversely with respect to the plane of oscillation of said pawl, a reaction element carried by said stationary portion in the path of movement of said cam element whereby reaction forces acting on said cam element are transmitted to said stationary portion, a manually operated lever pivotally mounted on said stationary portion, a shaft journaled for rotation on said stationary portion and connected directly to said lever, means for manually rotating said shaft to effect brake engagement and disengagement, said lever including an arm having a lost motion slot formed therein, one end of said cam rod being mounted for oscillation in a plane generally parallel to the plane of oscillation of said lever, a bracket pivoted in said one rod end, and a spring surrounding said shaft with one end thereof anchored on said lever, the other end of said spring being engaged by said pivoted bracket and held fast thereby thus holding said cam rod and said lever in assembled relationship.

2. The combination set forth in claim 1 wherein said spring includes an intermediate portion surrounding said shaft, said one end of rail spring engaging said lever and adapted to apply a torque to said lever in one direction, the other end of said spring being adapted to apply a force on said bracket which, when transmitted through said cam rod to said lever, creates a torque on said lever in the opposite direction.

3. The combination set forth in claim 1 wherein said one cam rod end is adapted to move within said slot when said lever is moved to a brake engaging position when said pawl tooth is out of registry with respect to the tooth spaces on the periphery of said parking gear, the relative motion that occurs between said cam rod and said lever being accompanied by yielding of said spring.

4. The combination set forth in claim 2 wherein said one cam rod end is adapted to move within said slot when said lever is moved to a brake engaging position when said pawl tooth is out of registry with respect to the tooth spaces on the periphery of said parking gear, the relative motion that occurs between said cam rod and said lever being accompanied by yielding of said spring.